UNITED STATES PATENT OFFICE.

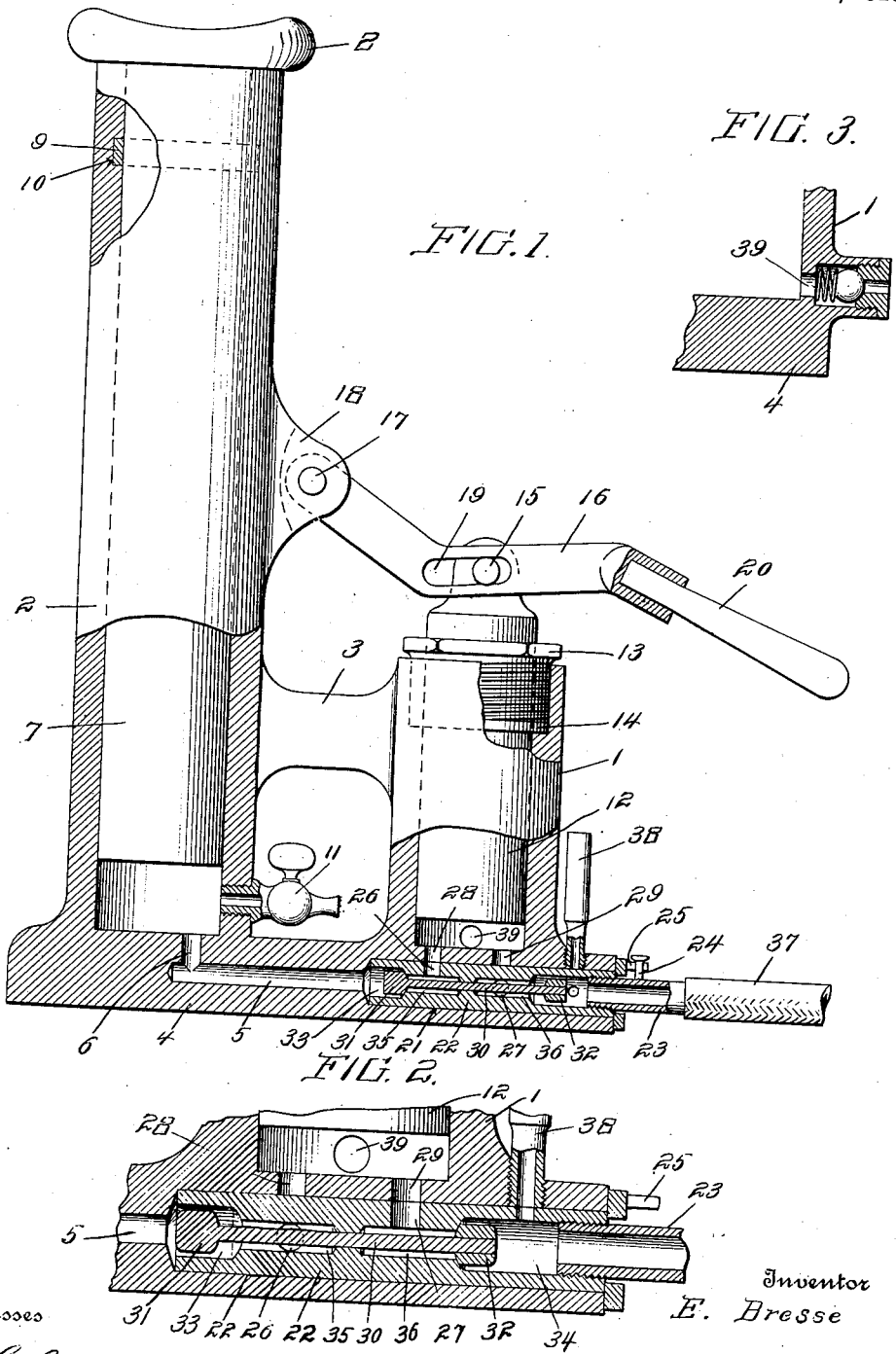

EMILE BRESSE, OF READVILLE, MASSACHUSETTS.

COMBINED TIRE-PUMP AND JACK.

1,177,476.   Specification of Letters Patent.   Patented Mar. 28, 1916.

Application filed June 7, 1915. Serial No. 32,698.

*To all whom it may concern:*

Be it known that I, EMILE BRESSE, a citizen of Canada, residing at Readville, in the county of Suffolk and State of Massachusetts, having invented new and useful Improvements in Combined Tire-Pumps and Jacks, of which the following is a specification.

This invention relates to a combined tire pump and jack, the object in view being to provide an article of the character referred to which is particularly adapted for use in connection with automobiles, the pump being utilized either to operate the jack for elevating the automobile or a portion thereof and also to inflate the tires or compress air for any desired purpose.

One of the principal objects of the invention is to provide means whereby the air compressed by the pump piston may be instantly diverted in an easy and expeditious manner so that the air may be forced under pressure into the jack cylinder or to a tire or compressed air tank.

With the above and other objects in view, the invention consists in the novel construction, combination and arrangement of parts, as herein described, illustrated and claimed.

In the accompanying drawings:—Figure 1 is a side elevation partly in section of a tire pump and jack embodying the present invention. Fig. 2 is a fragmentary section showing the other position of the turn plug valve. Fig. 3 is a fragmentary vertical sectional view of the pump cylinder, showing the air inlet valve.

Referring to the drawings 1 designates a pump cylinder and 2 a jack cylinder, the cylinders 1 and 2 being preferably connected and braced in fixed relation to each other by means of a cross web 3. The cylinders 1 and 2 are further connected by and supported upon a base 4 formed with a bore 5 having a branch 6 leading into the bottom of the jack cylinder 2 beneath the jack piston 7. The piston 7 is provided at its upper extremity with a head 8 and is rendered air tight by means of packing 9 shown in the form of a ring or washer set into a recess 10 in the inside wall of the cylinder 2.

11 designates a relief cock to release the air from the cylinder 2 and permit the head 8 and piston 7 to descend.

The pump cylinder contains a reciprocatory pump piston 12 which works through a bushing 13 threaded into the upper end of the cylinder 1 and bearing at its lower extremity against a compressible packing washer 14 to insure a tight joint between the pump cylinder and the piston. At its outer end the piston 12 is connected by a pin 15 to an operating lever 16, said lever being pivotally connected at 17 to a lug 18 on the jack cylinder 2, said lever being further provided with a slot 19 in which the pin 15 works as the lever 16 is operated. In the preferred embodiment of the invention, the lever 16 is provided with a detachable extension or handle 20 to increase the length of the lever and at the same time render the apparatus capable of being compactly stored or transported.

The bore 5 is enlarged to form a valve chamber 21 in which is arranged a valve 22 of the turn plug type, the valve 22 being cylindrical in shape and having attached to one end thereof a reduced nipple or extension 23 which extends outwardly beyond the base where it is provided with a projection or handle 24 by means of which a quarter turn may be given to the plug valve 22.

25 designates one of a pair of stops for limiting the turning movement of the valve 22 for a purpose which will presently appear.

The plug valve 22 is formed with two ports 26 and 27 arranged about ninety degrees apart, the port 26 being adapted to register with a port 28 of the cylinder 1 and the port 27 being adapted to register with a port 29 of the cylinder 1. The plug valve 22 is itself formed with a longitudinal bore to receive the slidable stem 30 of a check valve provided with the two heads or bodies 31 and 32 working in the valve chambers 33 and 34 and in communication with the ports 26 and 27 by means of the counter-bored or enlarged portions 35 and 36.

37 designates a flexible pipe adapted to be placed upon the nipple 23 and to be connected to a pneumatic tire for inflating the latter, and 38 designates an air pressure gage to avoid possibility of overinflation of the tire or tires.

To operate the device as a jack, the turn plug valve 22 is turned to the position illustrated in Fig. 1 which closes the port 29 and opens the port 28. Then when the piston 12 is operated by the lever, the air drawn in through the inlet port 39 of the pump cylinder 1 is forced by the check valve 31 into the base of the jack cylinder 2, thereby elevating the jack piston. To adapt the device for the inflation of a tire, the turn plug valve 22 is given a quarter turn to bring it to the position shown in Fig. 2 wherein communication between the pump cylinder and jack cylinder is cut off and the ports 27 and 29 brought into registry with each other. Then, in the operation of the pump, the air is forced past the check valve 32 through the nipple 23 and tube 37 to the tire.

While the device hereinabove described is particularly useful in connection with automobiles and the like, it may of course be used in any connection wherever it is found desirable to combine a pneumatic jack and a pump for compressing air.

What I claim is:—

1. The combination of a supporting base, a jack cylinder rising therefrom, a jack piston in said cylinder, a pump cylinder rising therefrom, a pump piston mounted to reciprocate therein, means for operating said piston, a turn plug valve mounted in said base and provided with inlet ports at an angle to each other, the pump cylinder being formed with ports with which the valve ports are adapted to register one at a time only, means for turning said plug valve, and a pair of check valves carried by a common slidable valve stem and controlling a passage leading to the jack cylinder and another passage or outlet connection in opposed relation to the first named passage.

2. The combination of a supporting base, a jack cylinder rising therefrom, a jack piston in said cylinder, a pump cylinder rising therefrom, a pump piston mounted to reciprocate therein, means for operating said piston, a turn plug valve mounted in said base and provided with inlet ports at an angle to each other, the pump cylinder being formed with ports with which the valve ports are adapted to register one at a time only, means for turning said plug valve, an outlet nipple having a fixed relation to said turn plug and projecting outside of the base, means for turning said nipple and turn plug, and check valves arranged at opposite sides of the plug valve ports to prevent the return flow of air from the jack cylinder and through the outlet nipple to the pump cylinder.

In testimony whereof I affix my signature in presence of two witnesses.

EMILE BRESSE.

Witnesses:
  WILLIAM J. GILLOOLY,
  WALTER M. CASS.